(12) United States Patent
Gongate et al.

(10) Patent No.: US 10,712,068 B2
(45) Date of Patent: Jul. 14, 2020

(54) TRANSPORT REFRIGERATION UNIT WITH A RENEWABLE ENERGY SOURCE AND METHOD OF OPERATION

(71) Applicant: Carrier Corporation, Palm Beach Gardens, FL (US)

(72) Inventors: Suzankumar Gongate, Telangana (IN); Chandrasekhar Puppala, Andhra Pradesh (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/737,501

(22) Filed: Jan. 8, 2020

(65) Prior Publication Data

US 2020/0141622 A1 May 7, 2020

Related U.S. Application Data (62) Division of application No. 15/981,131, filed on May 16, 2018, now Pat. No. 10,563,897.

(30) Foreign Application Priority Data

Feb. 13, 2018 (IN) .............................. 201811005337

(51) Int. Cl.
*F25B 49/02* (2006.01)
*F02B 63/04* (2006.01)
(Continued)

(52) U.S. Cl.
CPC ............ *F25B 49/027* (2013.01); *B60L 1/003* (2013.01); *B60L 1/02* (2013.01); *B60L 1/20* (2013.01);
(Continued)

(58) Field of Classification Search
CPC .................. F25B 49/027; F25B 27/005; F25B 2600/111; B60L 11/12; F03D 9/32;
(Continued)

(56) References Cited

U.S. PATENT DOCUMENTS 6,365,985 B1 4/2002 Cohen
7,937,955 B2 5/2011 Tsao
(Continued)

FOREIGN PATENT DOCUMENTS

CN 204095559 U 1/2015
DE 102006023416 A1 11/2007
(Continued)

OTHER PUBLICATIONS

European Search Report Application No. 19156999.5 dated Jun. 25, 2019; 14 pages.
(Continued)

*Primary Examiner* — Yuen Wong
(74) *Attorney, Agent, or Firm* — Cantor Colburn LLP (57) ABSTRACT

A method of operating a multiple energy source of a transport refrigeration unit determines if the transport refrigeration unit is at idle. The method may then electrically switch a condenser fan motor from an electrical power source to a battery charging circuit. The condenser fan motor may be back-driven via wind blowing through a condenser fan. Electrical power is thereby generated and applied to charge a battery via a battery charging circuit.

5 Claims, 5 Drawing Sheets

(51) Int. Cl.
*B60P 3/20* (2006.01)
*B60L 50/15* (2019.01)
*F03D 9/32* (2016.01)
*F03D 9/25* (2016.01)
*B60L 58/14* (2019.01)
*B60L 1/00* (2006.01)
*B60L 8/00* (2006.01)
*B60L 1/02* (2006.01)
*F25B 27/00* (2006.01)
*F25D 11/00* (2006.01)
*B60L 58/12* (2019.01)

(52) U.S. Cl.
CPC ............... *B60L 8/006* (2013.01); *B60L 50/15* (2019.02); *B60L 58/14* (2019.02); *B60P 3/20* (2013.01); *F02B 63/04* (2013.01); *F03D 9/25* (2016.05); *F03D 9/32* (2016.05); *F25B 27/005* (2013.01); *B60L 58/12* (2019.02); *B60L 2200/28* (2013.01); *B60L 2200/36* (2013.01); *B60L 2260/22* (2013.01); *F05B 2220/706* (2013.01); *F05B 2240/941* (2013.01); *F25B 2600/111* (2013.01); *F25D 11/003* (2013.01)

(58) Field of Classification Search
CPC .... F03D 9/25; F02B 63/04; B60P 3/20; F05B 2220/706; F05B 2240/941; F25D 11/003
See application file for complete search history.

(56) References Cited

U.S. PATENT DOCUMENTS

| | | | |
|---|---|---|---|
| 8,253,261 B2 | 8/2012 | Verbrugge et al. | |
| 8,572,972 B2 | 11/2013 | Li et al. | |
| 8,618,683 B2 | 12/2013 | Diaz | |
| 9,103,320 B1 | 8/2015 | Potts et al. | |
| 9,389,007 B1 * | 7/2016 | McKay | F25B 27/00 |
| 9,494,360 B2 | 11/2016 | Tsunoda et al. | |
| 9,707,844 B2 | 7/2017 | Arnold et al. | |
| 2002/0170756 A1 | 11/2002 | Mehta | |
| 2009/0146425 A1 | 6/2009 | Widisky | |
| 2009/0288577 A1 | 11/2009 | Kumar | |
| 2010/0065243 A1 | 3/2010 | Thomas et al. | |
| 2010/0154449 A1 | 6/2010 | Stover, Jr. et al. | |
| 2012/0038162 A1 | 2/2012 | Smith, Jr. et al. | |
| 2012/0132411 A1 | 5/2012 | Park et al. | |
| 2015/0121923 A1 | 5/2015 | Rusignuolo et al. | |
| 2016/0238195 A1 | 8/2016 | Bowdish et al. | |
| 2017/0163181 A1 | 6/2017 | Namuduri et al. | |

FOREIGN PATENT DOCUMENTS

| | | |
|---|---|---|
| DE | 102009034161 A1 | 2/2011 |
| DE | 102010005407 A1 | 7/2011 |
| JP | 2003299201 A | 10/2003 |
| JP | 2009165276 A | 7/2009 |
| WO | 2016101641 A1 | 6/2016 |
| WO | 2017176725 A1 | 10/2017 |
| WO | 2018009798 A1 | 1/2018 |

OTHER PUBLICATIONS

ISR/WO for Application No. PCT/US2018/063566 dated May 23, 2019; 20 pages.
PCT Invitation to Pay Additional Fees for application No. PCT/US/2018/063566 dated Mar. 15, 2019; 44 pages.
Quartey, G. et al. "Generation of Electrical Power by a Wind Turbine for Charging Moving Electric Cars", Journal of Energy Technologies and Policy, 2014, vol. 4, No. 3, pp. 19-29.
Search Report dated Nov. 19, 2019.

* cited by examiner

FIG. 6 ary source selection indicative of the wind energy source, and amongst a plurality of energy source selections to charge the battery prior to electrically switching the condenser fan motor.

TRANSPORT REFRIGERATION UNIT WITH A RENEWABLE ENERGY SOURCE AND METHOD OF OPERATION

CROSS REFERENCE TO RELATED APPLICATIONS

This application is a divisional of U.S. patent application Ser. No. 15/981,131, filed May 16, 2018, which claims the benefit of IN Application Number 201811005337, filed Feb. 13, 2018, both of which are incorporated herein by reference in their entirety.

BACKGROUND

The present disclosure relates to a transport refrigeration unit (TRU) and, more particularly, to a renewable energy source of the transport refrigeration unit and method of operation.

Traditional refrigerated cargo trucks or refrigerated tractor trailers, such as those utilized to transport cargo via sea, rail, or road, is a truck, trailer or cargo container, generally defining a cargo compartment, and modified to include a refrigeration system located at one end of the truck, trailer, or cargo container. Refrigeration systems typically include a compressor, a condenser, an expansion valve, and an evaporator serially connected by refrigerant lines in a closed refrigerant circuit in accord with known refrigerant vapor compression cycles. A power unit, such as a combustion engine, drives the compressor of the refrigeration unit, and may be diesel powered, natural gas powered, or other type of engine. In many tractor trailer transport refrigeration systems, the compressor is driven by the engine shaft either through a belt drive or by a mechanical shaft-to-shaft link. In other systems, the engine of the refrigeration unit drives a generator that generates electrical power, that in-turn drives the compressor.

When the cargo container is generally stored, and the TRU sits idle for long periods of time, a battery of the TRU may become drained or depleted thus hindering the ability to start the TRU when needed. Moreover, and with current environmental trends, improvements in transport refrigeration units are desirable particularly towards aspects of environmental impact. With environmentally friendly refrigeration units, improvements in reliability, cost, and weight reduction are also desirable.

SUMMARY

A method of operating a multiple energy source of a transport refrigeration unit according to one, non-limiting, embodiment of the present disclosure includes determining the transport refrigeration unit is at idle; electrically switching a condenser fan motor from receiving electrical power to a battery charging circuit; back-driving the condenser fan motor via wind blowing through a condenser fan; and generating electrical power by the condenser fan motor to charge a battery of the transport refrigeration unit via the battery charging circuit.

Additionally to the foregoing embodiment, a controller is configured to determine if the transport refrigeration unit is at idle.

In the alternative or additionally thereto, in the foregoing embodiment, an electrical relay is controlled by the controller to electrically switch the condenser fan motor.

In the alternative or additionally thereto, in the foregoing embodiment, the method includes selecting a wind energy source selection indicative of the wind energy source, and amongst a plurality of energy source selections to charge the battery prior to electrically switching the condenser fan motor.

In the alternative or additionally thereto, in the foregoing embodiment, the plurality of energy source selections includes a combustion engine generator selection indicative of a combustion engine generator for charging the battery.

In the alternative or additionally thereto, in the foregoing embodiment, the controller includes an energy source selection module and is configured to receive a fuel level signal from a fuel level sensor to at least in-part determine selection between the combustion engine generator and the wind energy source.

In the alternative or additionally thereto, in the foregoing embodiment, the selection module is configured not to select the combustion engine generator if the fuel level is below a pre-programmed, minimum, threshold.

In the alternative or additionally thereto, in the foregoing embodiment, the plurality of energy source selections includes an external power source selection indicative of an external power source for charging the battery.

In the alternative or additionally thereto, in the foregoing embodiment, the plurality of energy source selections includes a solar energy source selection indicative of a solar energy source for charging the battery.

In the alternative or additionally thereto, in the foregoing embodiment, the controller includes an energy source selection module configured to receive a battery charge level signal from a battery charge sensor to at least in-part determine the selection of the plurality of energy source selection.

In the alternative or additionally thereto, in the foregoing embodiment, the energy source selection module is configured not to select the combustion engine generator selection if the battery is fully charged.

In the alternative or additionally thereto, in the foregoing embodiment, wherein the controller includes an energy source selection module configured to receive a motion signal indicative of condenser fan motion to at least in-part determine a selection of the plurality of energy source selections.

In the alternative or additionally thereto, in the foregoing embodiment, the method includes selecting one of the plurality of energy source selections via a manual selection switch.

In the alternative or additionally thereto, in the foregoing embodiment, the manual selection switch includes an automatic selection position enabling the energy source selectin module of the controller to select one of the plurality of energy source selections base at least in-part on sensory input.

A method of operating a multiple energy source of a transport refrigeration unit according to another, non-limiting, embodiment includes determining if a combustion engine generator is available to charge a battery by an energy source selection module stored and executed by a controller; determining if the transport refrigeration unit is at idle by the energy source selection module if the combustion engine generator is not available; electrically switching a condenser fan motor from receiving electrical power to a battery charging circuit if the transport refrigeration unit is at idle; back-driving the condenser fan motor via wind blowing through a condenser fan; and generating electrical power by the condenser fan motor to charge the battery of the transport refrigeration unit via the battery charging circuit.

A transport refrigeration unit according to another, non-limiting, embodiment includes a battery; a combustion engine generator adapted to charge the battery; a renewable energy source adapted to charge the battery; a controller; a fuel level sensor configured to output a fuel level signal to the controller; and an energy source selection module executed by the controller and configured to select between the combustion engine generator and the renewable energy source based at least in-part on the fuel level signal.

Additionally to the foregoing embodiment, the renewable energy source is a wind energy source.

In the alternative of additionally thereto, in the foregoing embodiment, the wind energy source includes a condenser fan motor and a condenser fan adapted to drive the condenser fan motor when exposed to wind.

In the alternative of additionally thereto, in the foregoing embodiment, the transport refrigeration unit includes a motion sensor configured to output a motion signal indicative of rotational motion of the condenser fan, wherein the energy source selection module is configured to utilize the motion signal when selecting between the combustion engine generator and the wind energy source.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
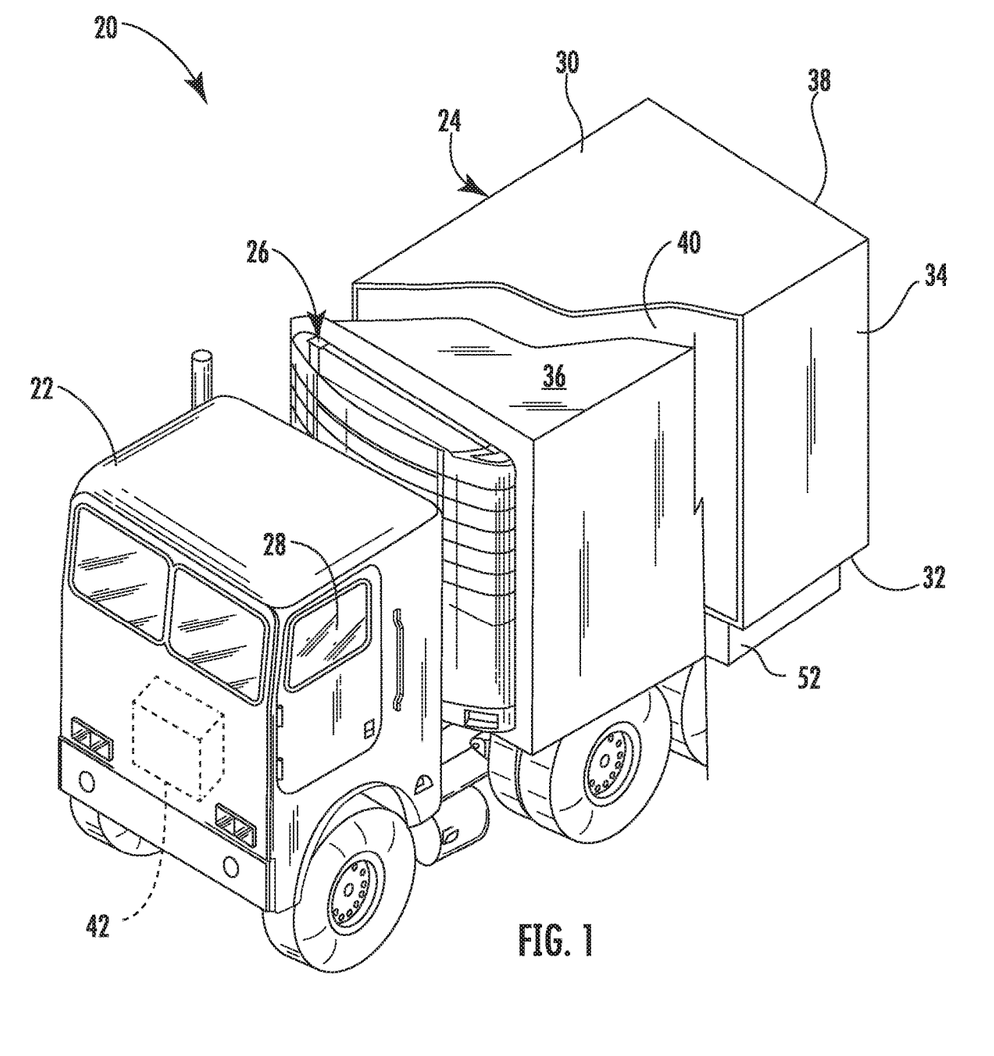
FIG. 1 is a perspective view of a tractor trailer system having a transport refrigeration unit (TRU) as one, non-limiting, embodiment of the present disclosure.

Referring to FIG. 1, a tractor trailer system 20 of the present disclosure is illustrated. The tractor trailer system 20 may include a tractor or truck 22, a trailer 24, and a transport refrigeration unit (TRU) 26. The tractor 22 may include an operator's compartment or cab 28 and a combustion engine 42 which is part of the powertrain or drive system of the tractor 22. The trailer 24 may be coupled to the tractor 22 and is thus pulled or propelled to desired destinations. The trailer may include a top wall 30, a bottom wall 32 opposed to and space from the top wall 30, two side walls 34 spaced from and opposed to one-another, and opposing front and rear walls 36, 38 with the front wall 36 being closest to the tractor 22. The trailer 24 may further include doors (not shown) located at the rear wall 38, or any other wall. Together, the walls 30, 32, 34, 36, 38 define the boundaries of a cargo compartment 40. It is further contemplated and understood that the cargo compartment may also be divided into two or more smaller compartments for different temperature cargo requirements.

Figure 2:
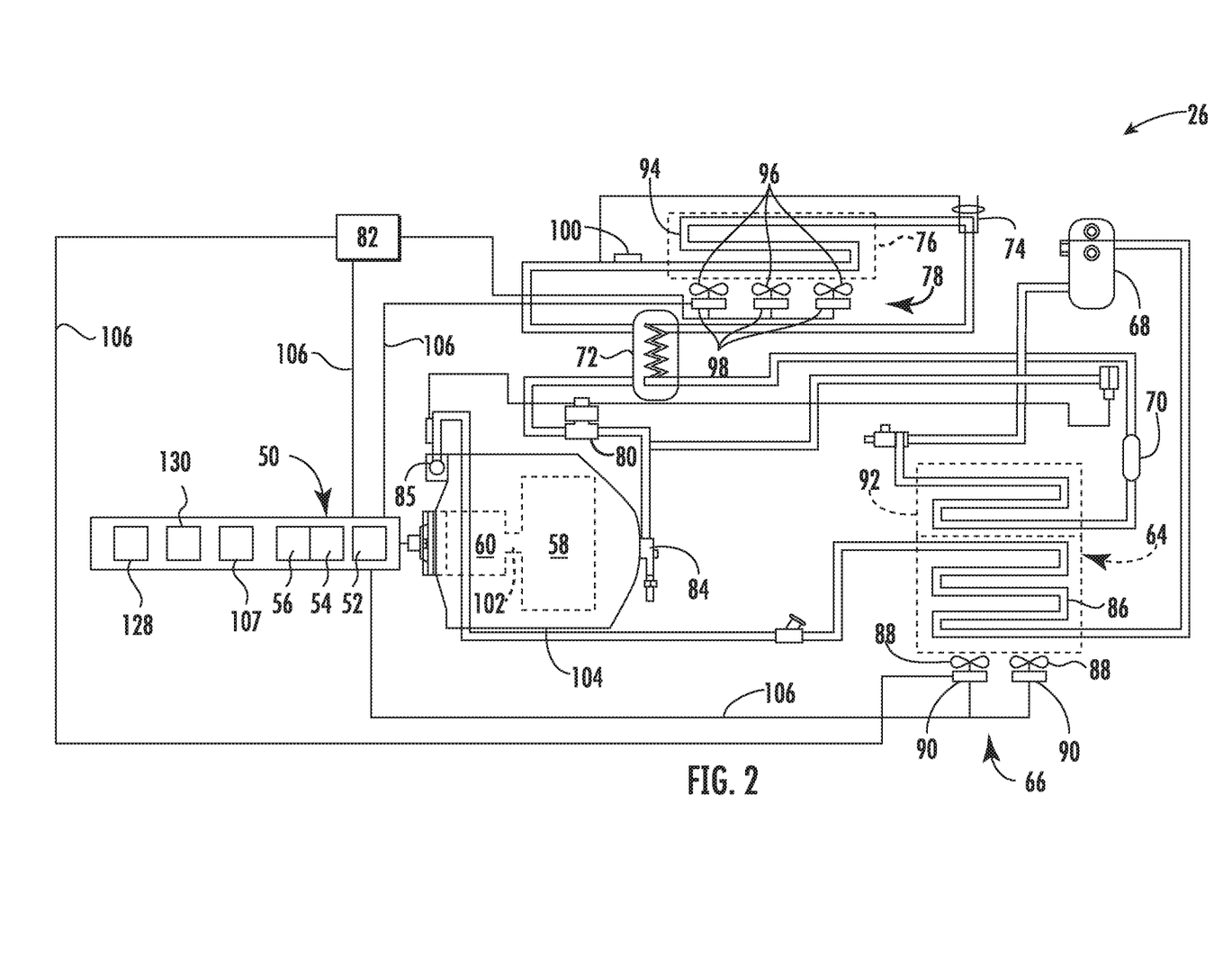
FIG. 2 is a schematic of the TRU.

Referring to FIGS. 1 and 2, the trailer 24 is generally constructed to store a cargo (not shown) in the compartment 40. The TRU 26 is generally integrated into the trailer 24 and may be mounted to the front wall 36. The cargo is maintained at a desired temperature by cooling of the compartment 40 via the TRU 26 that circulates airflow into and through the cargo compartment 40 of the trailer 24. It is further contemplated and understood that the TRU 26 may be applied to any transport container and not necessarily those used in tractor trailer systems. Furthermore, the transport container may be the trailer 24. Alternatively, the transport container may be constructed to be removed from a framework and wheels (not shown) of the trailer 24 for alternative shipping means (e.g., marine, rail, flight, and others).

The components of the TRU 26 may include a compressor 58, an electric compressor motor 60, a condenser 64 that may be air cooled, a condenser fan assembly 66, a receiver 68, a filter dryer 70, a heat exchanger 72, a thermostatic expansion valve 74, an evaporator 76, an evaporator fan assembly 78, a suction modulation valve 80, and a controller 82 that may include a computer-based processor (e.g., microprocessor). Operation of the TRU 26 may best be understood by starting at the compressor 58, where the suction gas (i.e., natural refrigerant) enters the compressor at a suction port 84 and is compressed to a higher temperature and pressure. The refrigerant gas is emitted from the compressor 58 at an outlet port 85 and may then flow into tube(s) 86 of the condenser 64.

Air flowing across a plurality of condenser coil fins (not shown) and the tubes 86, cools the gas to its saturation temperature. The air flow across the condenser 64 may be facilitated by one or more fans 88 of the condenser fan assembly 66. The condenser fans 88 may be driven by respective condenser fan motors 90 of the fan assembly 66 that may be electric.

By removing latent heat, the gas within the tubes 86 condenses to a high pressure and high temperature liquid and flows to the receiver 68 that provides storage for excess liquid refrigerant during low temperature operation. From the receiver 68, the liquid refrigerant may pass through a subcooler heat exchanger 92 of the condenser 64, through the filter-dryer 70 that keeps the refrigerant clean and dry, then to the heat exchanger 72 that increases the refrigerant subcooling, and finally to the thermostatic expansion valve 74.

As the liquid refrigerant passes through the orifices of the expansion valve 74, some of the liquid vaporizes into a gas (i.e., flash gas). Return air from the refrigerated space (i.e., cargo compartment 40) flows over the heat transfer surface of the evaporator 76. As the refrigerant flows through a plurality of tubes 94 of the evaporator 76, the remaining liquid refrigerant absorbs heat from the return air, and in so doing, is vaporized.

The evaporator fan assembly 78 includes one or more evaporator fans 96 that may be driven by respective fan motors 98 that may be electric. The air flow across the evaporator 76 is facilitated by the evaporator fans 96. From the evaporator 76, the refrigerant, in vapor form, may then flow through the suction modulation valve 80, and back to the compressor 58. A thermostatic expansion valve bulb sensor 100 may be located proximate to an outlet of the evaporator tube 94. The bulb sensor 100 is intended to control the thermostatic expansion valve 74, thereby controlling refrigerant superheat at an outlet of the evaporator tube 94. It is further contemplated and understood that the above generally describes a single stage vapor compression system that may be used for natural refrigerants such as propane and ammonia. Other refrigerant systems may also be applied that use carbon dioxide ($CO_2$) refrigerant, and that may be a two-stage vapor compression system.

The compressor 58 and the compressor motor 60 may be linked via an interconnecting drive shaft 102. The compressor 58, the compressor motor 60 and the drive shaft 102 may all be sealed within a common housing 104. In some embodiments, the compressor motor 60 may be positioned outside of the compressor housing 104, and therefore the interconnecting drive shaft 102 may pass through a shaft seal located in the compressor housing. The compressor 58 may be a single compressor. The single compressor may be a two-stage compressor, a scroll-type compressor or other compressors adapted to compress natural refrigerants. The natural refrigerant may be $CO_2$, propane, ammonia, or any other natural refrigerant that may include a global-warming potential (GWP) of about one (1).

Figure 3:
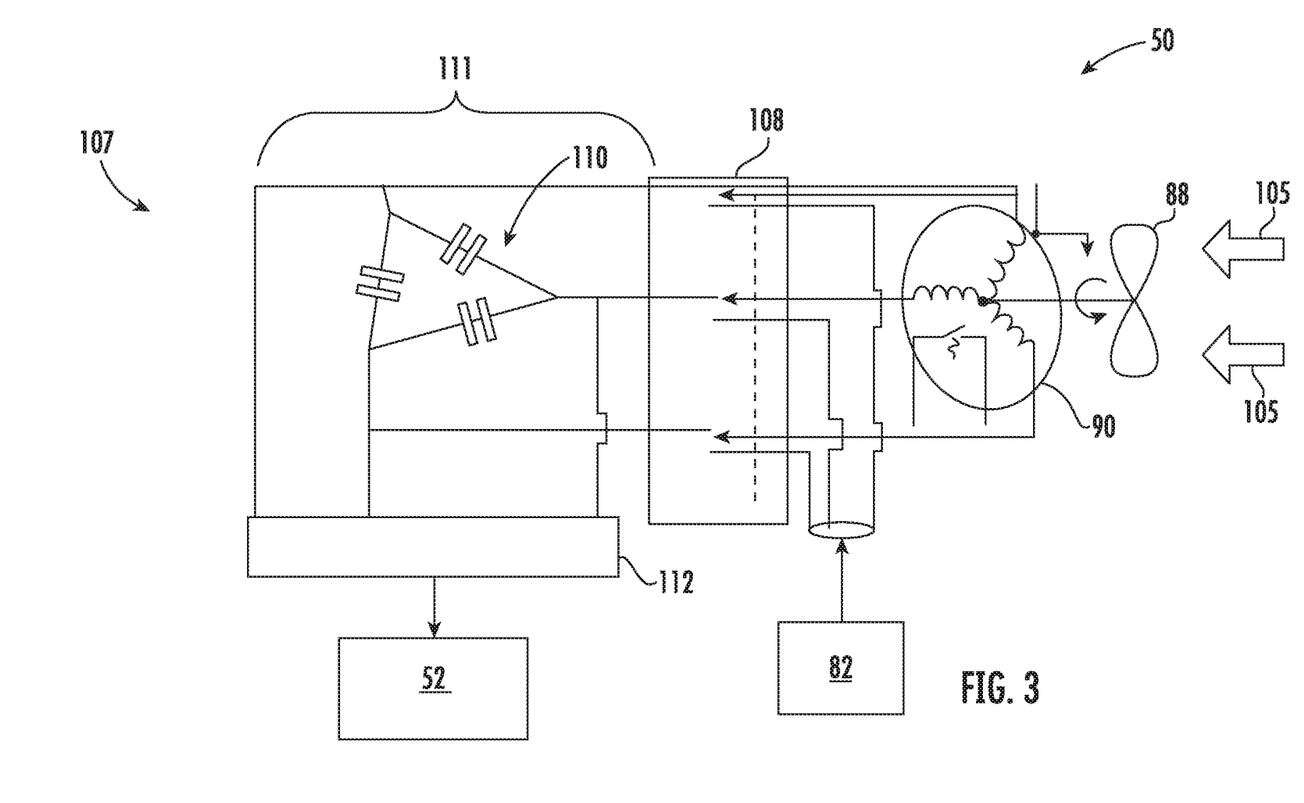
FIG. 3 is a schematic of a renewable, wind-energy, source of the TRU.

Referring to FIGS. 2 and 3, the TRU 26 further includes a multiple energy source 50 configured to selectively power the compressor motor 60, the condenser fan motors 90, the evaporator fan motors 98, the controller 82, and other components (i.e., various solenoids and/or sensors) via, for example, electrical conductors 106. The multiple energy source 50 may include an energy storage device 52, and a generator 54 mechanically driven by a combustion engine 56 that may be part of, and dedicated to, the TRU 26. The energy storage device 52 may be at least one battery. In one embodiment, the battery 52 may be configured to provide direct current (DC) electric power to one or both of the evaporator and condenser fan motors 98, 90, while the generator 54 provides electrical power to the compressor motor 60. The electric power provided to the compressor motor 60 may be alternating current (AC) or DC with the associated configuration of inverters and/or converters (not shown) typically known in the art. Accordingly, the compressor motor 60 may be an AC motor or a DC motor. The fan motors 90, 98 may be DC motors corresponding to the DC power provided by the battery 52. In one embodiment, the energy storage device 52 may be secured to the underside of the bottom wall 32 of the trailer 24 (see FIG. 1). It is further contemplated and understood that other examples of the energy storage device 52 may include fuel cells, and other devices capable of storing and outputting DC power.

The condenser 64 is generally designed for free air flow from the outside of the cargo compartment 24. That is, outside ambient air may be free to flow over or through the condenser 64 and fans 90, and out the top and/or the bottom of the TRU 26. Such airflow may be induced by wind (see arrows 105 in FIG. 3), and may occur when the TRU 26 is not in an operational state and/or the TRU 26 and the cargo container 24 is generally sitting idle (e.g., placed in a storage facility, etc.). When sitting idle, the battery 52 may discharge over time and/or may become depleted by providing low amounts of power to parasitic loads over, for example, extended periods of time. Examples of parasitic loads may include the controller 82 and various sensors. The controller 82 may further include remote systems (e.g., a Telematics system) configured to maintain a wireless, two-way, communication with a segment of the controller 82 that may be local (i.e., proximate to the TRU 26).

Referring to FIG. 3, the multiple energy source 50 may include a renewable energy source 107 (e.g., wind energy source) that may utilize one or more of the condenser fans 88 and fan motors 90 as generators (i.e., two illustrated in FIG. 2). The condenser fan motors 90 may be induction motors and may be AC or DC motors (i.e., illustrated as AC motors). In this embodiment, the condenser fan motors 90 may be described as energy conversion devices because they serve a dual purpose as motors and generators; and, the associated condenser fans 88 may be described as a plurality of airfoils because they serve a dual purpose as fans and turbines.

When the TRU 26 is operating in a normal operating state (i.e., conditioning air in the cargo compartment), the energy conversion device 90 function as a motor and the plurality of airfoils 88 are mechanically driven by the motor 90 thus functioning as a fan. When the TRU 26 is generally idle and operating in a battery charging state, the plurality of airfoils 88 function as a turbine that mechanically drives the energy conversion device 90 that acts as a generator. When functioning as a generator, the energy conversion device 90 produces electrical energy that may charge the battery 52. That is, wind may drive the airfoils 88, and the airfoils 88 may drive the energy conversion device 90 in a reverse direction when compared to normal cooling operation of the TRU 26.

This renewable, wind-energy, source 107 may be used to conveniently, and cost effectively, charge the battery 52. The renewable, wind-energy, source 107 may include an isolation relay 108, an excitation capacitor, or capacitor bank, 110, and a rectifier 112 that may be, or may be part of, a regulator battery charger. The circuit may be arranged with the isolation relay 108 electrically connected between the motor(s) 90 and the excitation capacitor bank 110. The capacitor bank 110 may be electrically connected between the isolation relay 108 and the rectifier 112.

When the energy conversion device 90 is being 'back-driven' by wind, the device generates electricity by using residual magnetism in the motor rotor (not shown) and the excitation capacitor bank 110. In another embodiment, a small excitation voltage may be used. That is, a small voltage may be applied to excite the magnetic field in the motor windings thus starting the power generation once there is rotation. If the residual magnetism is used, the self-generated voltage may be relatively small and the capacitor bank 110 may assist in boosting this voltage. If the energy conversion device 90 is an AC motor, the AC power generated by the back-driven motor, or device, 90 may be rectified by the rectifier 112 to DC power and used to recharge the battery 52. It is further contemplated and understood that the energy conversion device 90 may generally be a DC motor capable of generating electricity when back-driven. In this embodiment, the wind energy source 107 may not require the rectifier 112 to charge the battery 52. Instead, a voltage regulator may be used to condition the generated electricity.

The isolation relay 108 may function to keep the normal operating state of the TRU 26 separate from the wind-energy battery charging state. More specifically, the isolation relay 108 may be in a first position (e.g., open position) when the TRU 26 is in the normal operating state (i.e., conditioning the air in the cargo compartment), and may be in a second position (e.g., closed position) when the TRU is in the battery charging state.

Referring again to FIG. 2, the controller 82 may generally control the position of the relay 108. Alternatively, the relay position may be switched manually. In another embodiment, the renewable wind-energy source 107 may be independent from the condenser fans 88 and condenser motors 90. For example, wind-energy source 107 may include a dedicated turbine and a dedicated generator to produce electrical power that may be used to charge the battery 52 and/or operate other components of the TRU 26, and regardless of whether the TRU 26 is in the normal operating state or the battery charging state.

Figures 4, 5:
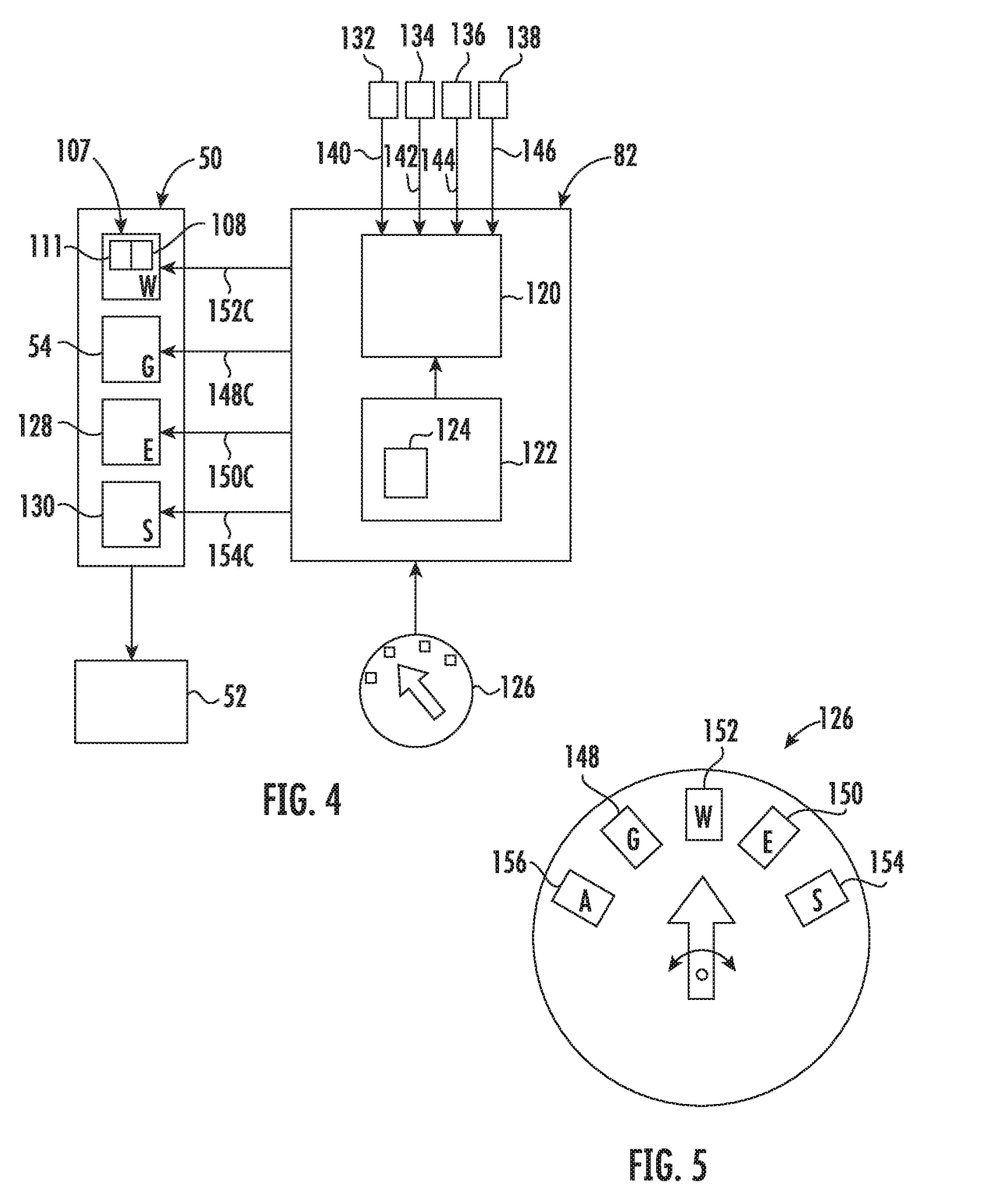
FIG. 4 is a partial schematic of the TRU illustrating a plurality of energy sources of the TRU configured to selectively charge a battery.
FIG. 5 is a front view of a manual energy source selection switch of the TRU.

Referring to FIG. 4, another embodiment of the TRU 26 may include the controller 82 having a processor 120 (e.g., microprocessor) and an electronic storage medium 122 that may be computer writeable and readable. The TRU 26 may further include an energy source selection module 124, the multiple energy source 50 adapted to selectively charge the battery 52, a manual energy source selection switch 126, and various sensors configured to generate and send sensory input signals to the processor 120 for use by the energy source selection module 124 when executed.

As previously described, the multiple energy source 50 may include the combustion engine generator 54, an external energy source 128, the wind energy source 107, and other renewable energy sources 130, such as for example, a solar energy source. The external energy source 128 may be electric power provide by a local utility company. More specifically, the TRU 26 may be plugged into a power receptacle when the transport container is not in transport (i.e., is in storage).

The manual energy source selection switch 126 may be configured to effect manual selection of one of the multitude of energy sources 50 used to charge the battery 52. In one embodiment, the selection switch may be selectively, directly, hard wired to the energy sources 54, 107, 128, 130. In another example, the energy source selection switch 126 may be configured to communicate with the energy source selection module 124, or a combination thereof.

The energy source selection module 124 may be software-based, may be stored in the electronic storage medium 122, and may be executed by the processor 120. The selection module 124 may be configured to automatically select one or more of the energy sources 54, 107, 128, 130 used to charge the battery 52 under a pre-defined, or pre-programmed, set of conditions. Such conditions may include, but are not limited to, the charge level of the battery 52, available fuel for running the combustion engine 56 used to drive the generator 54, rotational speed of the condenser fan 88 when the TRU 26 is at idle, solar intensity of the sun, and any variety of other conditions. Depending upon the current conditions, the energy source selection module 124 may choose the optimal and/or most efficient energy source to charge the battery 52.

Example of sensors generally associated with TRU conditions may include a fuel level sensor 132, an ambient light sensor 134 (i.e., solar intensity), a speed sensor 136 indicative of fan or wind speed, a battery charge sensor 138, and others. The sensors 132, 134, 136, 138 are configured to send respective sensory signals (see arrows 140, 142, 144, 146) to the processor 120 for use by the energy source selection module 124. The energy source selection module 124 may be pre-programmed with a variety of parameters. For example, parameters may include a minimum fuel level threshold or set point, a minimum speed threshold, a minimum light threshold, and others. The energy source selection module 124 may include pre-programmed algorithms used to apply the various signals 140, 142, 144, 146 to achieve the most optimal and/or efficient means of charging the battery 52.

For example, the fuel level signal 140 received by the module 124 may indicate of a fuel level that is below the pre-programmed fuel level threshold. This low level condition may influence the module 124 not to use the combustion engine generator 54 to charge the battery 52. In another example, the ambient light signal 142 received by the module 124 may indicate an ambient light condition (i.e., night time, or a cloudy day) that is below a pre-programmed ambient light threshold. This low light condition may influence the module 124 not to attempt use of the solar energy source 130 to charge the battery 52. In another example, the speed signal 144 generated by the speed sensor 144 may indicate a wind speed, or fan speed, that is below a pre-programmed speed threshold. This low speed condition may influence the module 124 not to use the wind energy source 107.

Referring to FIG. 5, the manual energy source selection switch 126 may include a variety of selections and/or positions manual chosen by a user of TRU 26. Such manual selections may generally override use of the energy source selection module 124 and/or one or more of the parameters and/or sensory input signals 140, 142, 144, 146. The displayed selections may include a generator selection 148, an external source energy selection 150, a wind energy source selection 152, a solar energy source selection 154, an automatic selection 156, and others. In operation, when the switch 126 is in the automatic selection 156 position, a signal may be sent to the processor 120 that generally enables operation of the energy source selection module 124 (i.e., or a pre-programmed mode of operation), thus applying the pre-programmed thresholds and parameters factors. When the switch 126 is in any one of the other selections, or positions, 148, 150, 152, 154, the associated, respective, energy source 54, 128, 107, 130 may be applied to charge the battery 52 regardless of what any number of the conditions and/or parameters may be. In one embodiment, the selections 148, 150, 152, 154 may be applied by the energy source selection module 124 in the form of respective command signals (see arrows 148C, 150C, 152C, 154C in FIG. 4).

Figure 6:
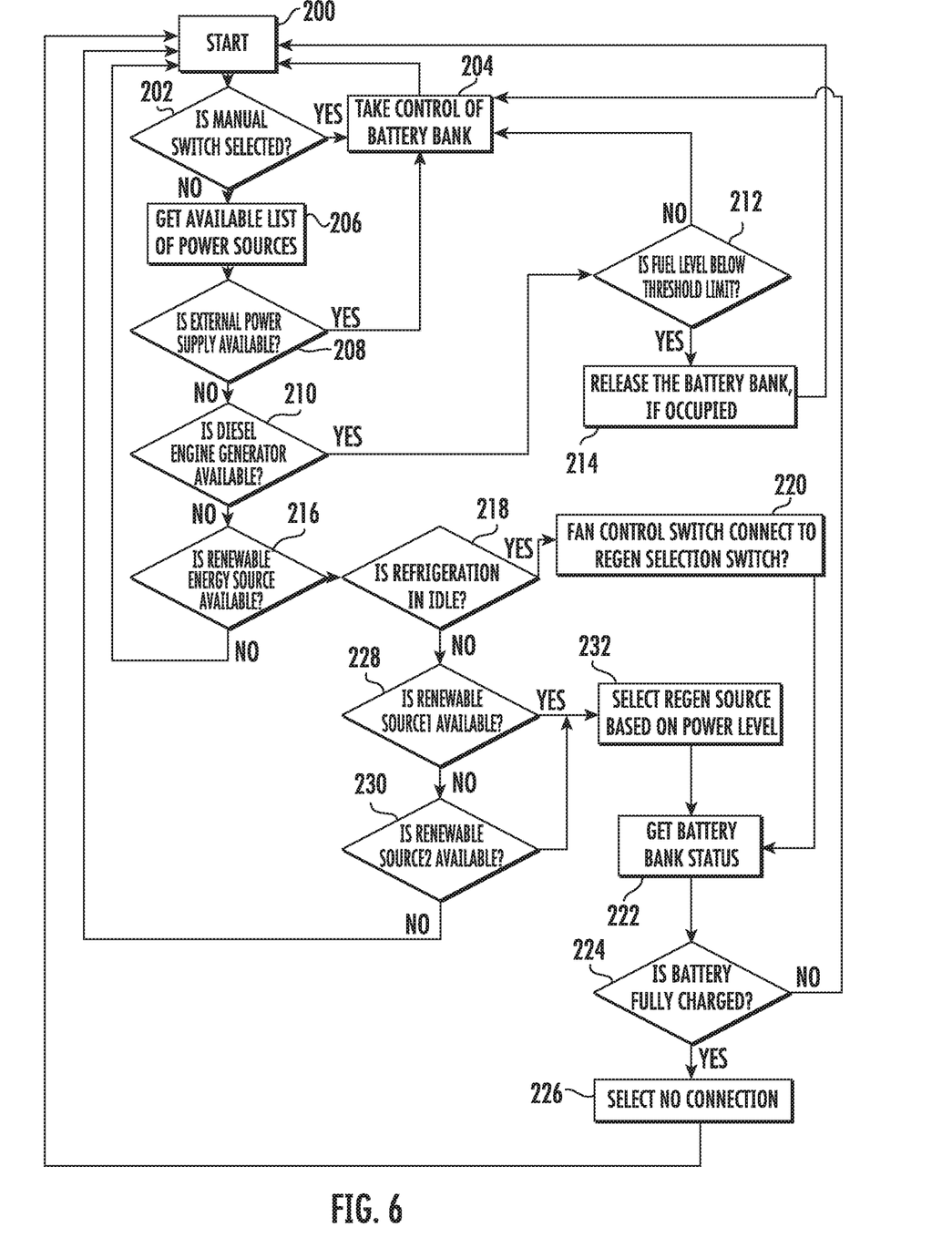
FIG. 6 is flow chart of a method of operating the TRU.

Referring to FIG. 6, a method of operating the TRU to charge the battery 52 is illustrated. At block 200, the method is generally started. At block 202, the module 124 may determine if the manual switch 126 is generally in-use, or selected. If yes, and at block 204, the manual switch 126 generally assumes manual control or selection relative to charging the battery 52. If no, and at block 206, the module 124 may utilize a listing of the multitude of energy sources 54, 107, 128, 130.

Generally from the listing, and at block 208, the module 124 may determine if the external energy source 128 is. If yes and at block 204, the external energy source 128 provide the power to charge the battery 52.

If no and at block 210, the module 124 may determine if the combustion engine generator 54 is available. If yes and at block 212, the module 124, via the fuel level signal 140, may determine if the fuel level is below the pre-programmed threshold. If yes and at block 214, the generator 54 is not used to charge the battery 52, and the operating logic loops back to block 200. If no and at block 204, the generator 54 charges the battery 52.

If the combustion engine generator 54 is determined not to be available by the module 124, and at block 216, the module 124 may determine if a renewable energy source 107, 130 is available. If no, the control logic returns to block 200. If yes and at block 218, the module 124 may determine if the TRU 26 is in idle. If yes and at block 220, the module 124 may send a command signal to the relay 108 of the wind energy source 107 that switches from electrical power being supplied to the condenser fan motor 90 to a battery charging circuit 111 of the wind energy source 107. At block 222, the module 124 may retrieve a battery charge status. At block 224, the module 124 may determine if the battery is fully charged. If no and at block 204, the wind energy source 107 may charge the battery 52. If yes and at block 226, the module 124 may not make any selection and returns to block 200.

Referring back to block 218, and if the TRU 26 is not at idle, the control logic may proceed to block 228. At block 228 and block 230, the module 124 may determine what other renewable energy sources (e.g., solar energy source 130) are available. If none, the control logic may return to block 200. If, for example, more than one renewable energy source is available, and at block 232, the module 124 may determine which renewable energy source is capable of produces the most power via sensory signals, choose the appropriate source, and proceed to block 222.

It is contemplated and understood that the order and/or priority of steps described above may be changed. For example, availability of the external power source 128 may not have priority over the generator 54 and/or the renewable energy sources.

Benefits and advantages of the present disclosure includes an efficient, cost effective, and convenient means to charge a battery of a TRU. By maintaining a charged battery, robustness of the TRU and starting confidence is improved, and service calls are minimized.

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A transport refrigeration unit comprising:
   a battery;
   a combustion engine generator adapted to charge the battery;
   a renewable energy source adapted to charge the battery;
   a controller;
   a fuel level sensor configured to output a fuel level signal to the controller; and
   wherein the controller is configured to select between the combustion engine generator and the renewable energy source based at least in-part on the fuel level signal, the renewable energy source is a wind energy source, and the wind energy source includes a condenser fan motor and a condenser fan adapted to drive the condenser fan motor when exposed to wind.

2. The transport refrigeration unit set forth in claim 1, further comprising:
   a motion sensor configured to output a motion signal indicative of rotational motion of the condenser fan, wherein the controller is configured to utilize the motion signal when selecting between the combustion engine generator and the wind energy source.

3. The transport refrigeration unit set forth in claim 2, wherein the transport refrigeration unit is adapted to be located at end of a truck, trailer, or cargo container.

4. The transport refrigeration unit set forth in claim 3, further comprising:
   a battery charging circuit, wherein the controller is configured to electrically switch the condenser fan motor from receiving electrical power to the battery charging circuit.

5. The transport refrigeration unit set forth in claim 4, wherein the condenser fan motor is adapted to be driven by the wind energy source blowing through the condenser fan, and thereby generating electrical power by the condenser fan motor to charge the battery via the battery charging circuit.

* * * * *